United States Patent [19]
Turquin

[11] 3,807,789
[45] Apr. 30, 1974

[54] TRAILERS

[75] Inventor: Michel Turquin, Hon-Hergies Par Bavay, France

[73] Assignee: Etablissements Bertrand Faure, Puteaux, France

[22] Filed: Mar. 9, 1972

[21] Appl. No.: 233,142

[30] Foreign Application Priority Data
Mar. 10, 1971 France .............................. 71.08348

[52] U.S. Cl. ........... 296/23 R, 296/24 R, 296/28 R, 52/64
[51] Int. Cl. ............................................. B60p 3/32
[58] Field of Search .... 296/23 R, 24 R, 28 R, 28 A, 296/31 P; 52/64, 67

[56] References Cited
UNITED STATES PATENTS

| | | | |
|---|---|---|---|
| 3,566,554 | 3/1971 | Schaffer et al. .......................... | 52/64 |
| 3,496,689 | 2/1970 | Nerem ................................ | 296/31 P |
| 2,502,320 | 3/1950 | Guernsey ......................... | 296/28 A |
| 1,965,451 | 7/1934 | Brown ................................ | 296/24 R |
| 3,495,865 | 2/1970 | Hill ....................................... | 296/23 |
| 2,965,412 | 12/1960 | Henderson et al. ...................... | 52/67 |
| 2,494,680 | 1/1950 | Wiley ..................................... | 52/67 |
| 3,123,393 | 3/1964 | Markwick ........................... | 296/31 P |

Primary Examiner—Philip Goodman
Assistant Examiner—John A. Carroll
Attorney, Agent, or Firm—Eric H. Waters

[57] ABSTRACT

The trailers comprises two prefabricated rigid caissons each constituted by an outer lateral wall of the trailer and by a longitudinal vertical perforated panel inside the trailer assembled on said wall by means of transverse furnishing and partitioning elements. These two caissons are assembled rigidly between themselves by means of other transverse bracing elements. The transverse dimension of each caisson is of the order of a quarter of the width of the trailer.

10 Claims, 5 Drawing Figures

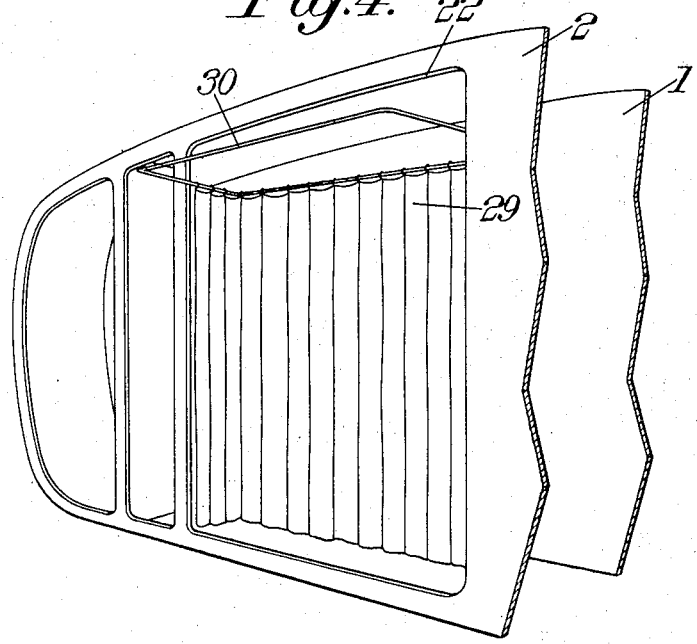
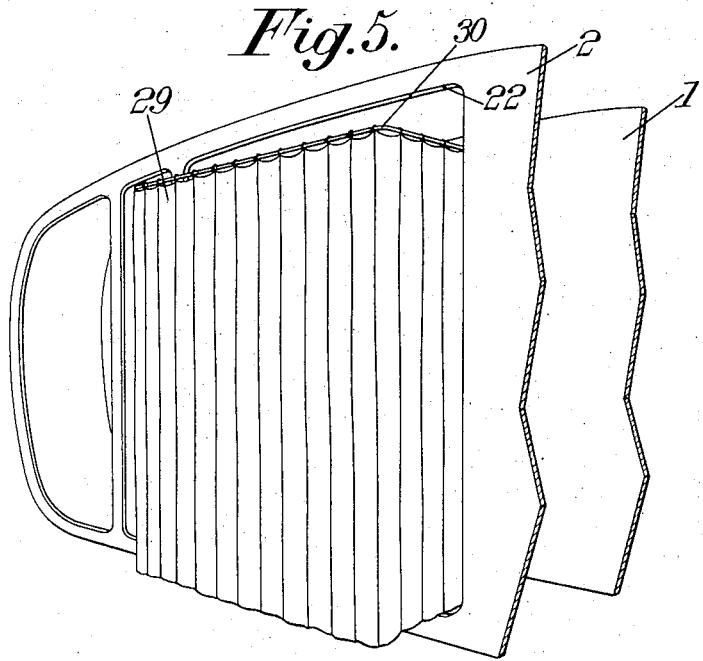

TRAILERS

The invention relates to, house trailer bodies (sometimes known as caravans) and the like mounted on wheels and intended to be drawn by automobiles to parking sites where they serve as housings for the automobile travelers by providing them on the spot with quarters which are not only a shelter against bad weather, but which are equipped inside with furniture and articles necessary for everyday life (beds, tables, benches, even washbasins, stoves, etc.).

The invention relates more particularly, because it is in their case that its application seems to offer the most advantage, but not exclusively, among such trailers, to those of the non-convertible rigid type.

It is a particular object of the invention to provide trailers which respond to the various exigencies of practice better than hitherto, especially so that they are more functional, lighter, stronger and more economical.

The trailers according to the invention are essentially characterised in that they comprise two prefabricated rigid caissons each constituted by an outer lateral wall of the trailers and by a longitudinal vertical perforated panel inside the trailers and assembled on said wall by means of transverse furnishing and partitioning elements, these two caissons being assembled rigidly between themselves by means of other transverse bracing elements, said caissons and their assembly being such that the transverse dimension of each caisson is of the order of a quarter of the width of the trailers.

In preferred embodiments, it is advantageous to resort additionally to one and/or other of the following features, although they are not indispensable:

the lateral walls and perforated panels bounding the caissons are constituted by sheets of cut-out plywood;

certain at least of the transverse furnishing and partitioning elements bracing the caissons are constituted by panels of the same nature and of the same thickness as the walls and perforated panels which bound them longitudinally;

the upper portion, of the floor, which is formed as a supporting surface capable of withstanding wear is limited strictly to that usable in actual fact as flooring for the inside of the trailer;

the various openings cut-out in the perforated panels are bounded by rounded closed curves including no sharp angles;

to enable the formation of a toilet closet inside one of the two caissons between the outer wall of this caisson and an opening formed in the constituent inner panel of the same caisson, a closure device easily removable is mounted on this opening, which device can occupy with respect to the said opening two different positions for which it projects respectively towards the inside and towards the outside of the shell.

The invention comprises, apart from these main features, certain other features which are preferably used at the same time and which will be more explicitly considered below.

In the following there will be described a preferred embodiment of a trailer according to the invention with reference to the accompanying drawings, intended of course to be purely illustrative and in no way limiting.

Figure 1:
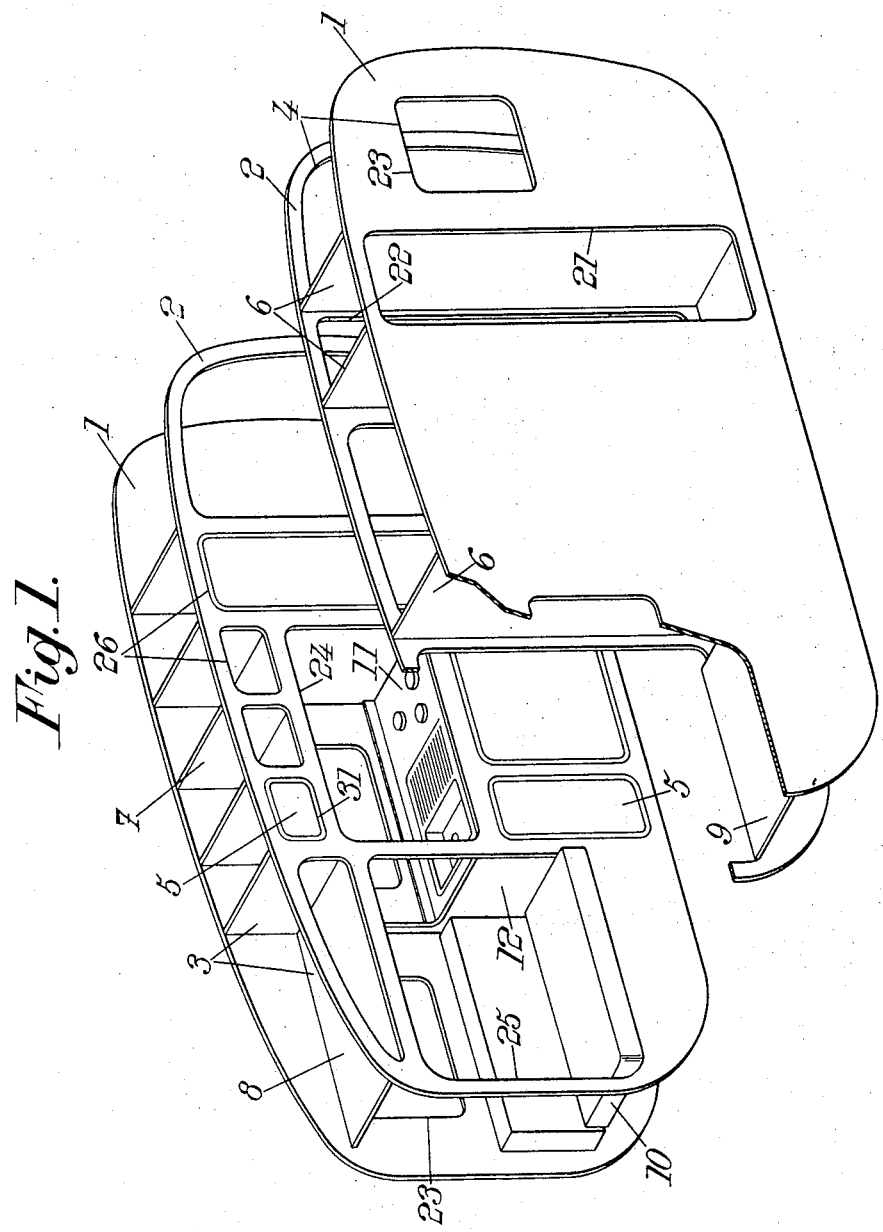
FIG. 1 shows in perspective view, with portions removed, two constituent caissons of one embodiment of a trailer according to the invention.

Lastly, FIGS. 4 and 5 show in perspective, respectively in its two positions, a closure member constructed according to the invention for hiding an opening formed in an inner panel of such a caisson.

In the embodiment illustrated, the caravan is essentially constituted by two box girders of cross-braced girders (caissons) extending longitudinally and each composed:

of a first outer longitudinal vertical flat panel 1, of a second inner longitudinal vertical flat panel 2 parallel to the first, and of cross-bracing elements 3 transversely uniting these two panels in rigid manner.

Each panel can be constituted of a sufficiently strong plastics material in sheets, reinforced or not, or of metal, or again of compressed wood or plywood in sheets of, for example, 6 to 10 mm thickness, or of any other construction, complex or not, capable of providing in a flat form a sufficient strength (composite sandwiches comprising especially a central cellular structure, as a honeycomb or as a rigid foam between two skins).

Of course the outer panels 1 can be externally coated with lacquers or other protective layers resistant to bad weather and internally with heat-insulating padding.

Each panel has openings 4 cut-out in it, for which certain uses will be enumerated below.

These various openings, as well as the contours of the panels, are advantageously cut-out by means of milling cutters of small diameter guided by suitable templets so that the shavings removed in these cutting-out operations have a minimum total volume.

The portions of panels removed from said openings are then serviceable in the sense that they are in the shape of sheets with dimensions neighboring those of these openings, but a little smaller, capable of constituting doors 5 to close the said openings, in conjunction with peripheral strips 31.

Or again these cut-out portions can constitute after suitable shaping certain at least of the bracing elements 3.

As seen in the drawings, the openings 4 are preferably cut-out so that they are bounded by rounded closed curves not including any sharp angle: this feature is favorable to the strength of the cut-out panels, to the safety of the users and to esthetic appearance.

The bracing elements 3 form either inner partitions 6, or vertical 7 or horizontal 8 cupboard walls, or parts of other furnishings such as horizontal tables 9 intended for example for supporting flexible seating structures (cushions 10 or the like) or horizontal working surfaces 11 or vertical walls 12 for kitchen units (sink and/or cooker) or sanitary units.

Each of the two caissons formed by the assembly of the panels 1 and 2 and the elements 3 is prefabricated, that is to say manufactured independently of the rest of the trailer.

The assembly concerned can be carried out in any desirable manner. In one embodiment, the panels are assembled with the bracing elements by coating the edges of these elements with glue, then by clamping the panels firmly against these edges in suitable presses, with heating if necessary.

It should be pointed out that, as the elements 3 remain perpendicular to the panels on the clamping concerned, it is preferable that they should not be all parallel between themselves so that they do not risk being tilted as a group to the plane perpendicular to the panels on said clamping.

The "cross-braced" beam thus obtained offers excellent strength to deformation in any direction, as well as in flexion or in torsion, in traction or in compression.

This caisson structure is quite original in that the transverse dimension of each caisson is equal to only a fraction of the width of the trailer, which fraction is generally comprised between one-third and one-fifth and preferably of the order of one-fourth of this width. Each caisson can thus comprise only a portion of a furnishing extending, in the finished trailer, over the whole width of the latter.

Figure 2:
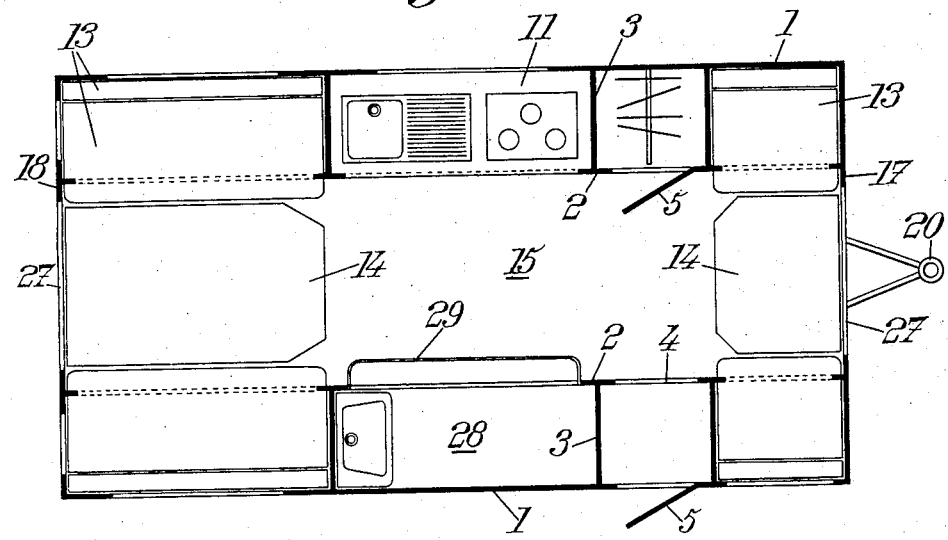
FIGS. 2 and 3 show the caravan constructed by means of such caissons, respectively in horizontal section along the line II—II of FIG. 3 and in rear view.
Figure 3:
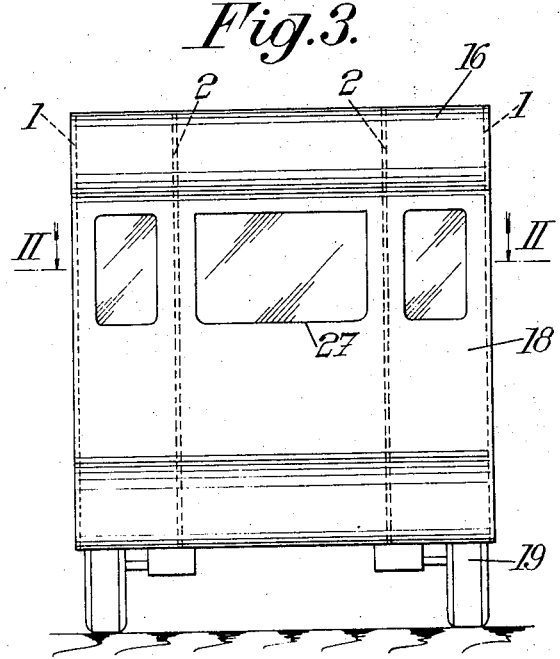

This is the case for example with convertible furniture with multiple uses currently called "dinettes" which in the daytime can form two lateral benches 13 (FIG. 2) facing each other and separated by a table 14 and on the other hand at night can form a bed for one or two persons.

A basic advantage of the invention is the following. Instead of the furniture elements equipping the trailer being designed and manufactured independently of the hull of the trailer and then installed in this hull after its completion, they are here incorporated in the structure itself of the said hull and participate themselves in contributing to the rigidity of the latter.

In other words the strength itself of the various partitioning and furnishing elements integrated into the two lateral "caissons" contributes to the strength of the trailer itself, which was not the case in known constructions.

There is thus eliminated the double employment of strengthening panels by reducing to the strict minimum, the number, the surface and the thickness of these panels, which permits a lightening and considerable economies in a caravan of given dimensions.

Once the two caissons have been manufactured, they are assembled to one another by transverse bracing elements of which certain also can be constituted by partitioning or furnishing elements.

In the preferred embodiments, these bracing elements comprise essentially the floor 15, the roof 16, the front 17 and rear 18 surfaces of the trailer, or at least the rigid frameworks of said surfaces.

The said surfaces are preferably all "developable".

There is provided under the hull a suspended axle with its wheels 19, or two independent wheels with their respective suspension systems, each assembly constituted by a wheel and its suspension system being mountable under one of the two caissons before or after its assembly to the other; to the front of this hull is fixed a traction hitch 20 and the assembly is equipped with signalling and braking installations.

In the embodiment illustrated, the various openings 4 cut-out in the panels 1 and 2 serve respectively as outer entrance door 21 (FIG. 1), inner passages 22, windows 23, aperture 24 providing access to the working surface 11 of the kitchen unit, spaces 25 above the benches and doors 26 for the cupboards.

It should be noted that, in this embodiment, the space comprised between the two lateral caissons is free, which enables complete visibility throughout the caravan from front to rear of the latter. In order that the driver of the automobile which draws the trailer may, whilst driving, use the normal rear mirror of this car effectively by looking into the rear window of the car, it suffices to provide in the middle of the front and rear surfaces of the caravan, two openings 27 fitted with transparent windows.

This possibility of normal use of the rear view mirror constitutes a considerable advantage of this type of construction.

It should also be noted that the upper portion, of the floor 15, which must be truly formed as a "floor," that is to say of a horizontal surface resistant to wear and easy to clean, is strictly limited to that which will effectively be used as a floor inside the trailer. It is unnecessary to have such horizontal flooring surfaces arranged under the furniture, which also constitutes a means of economy.

The above construction imposes on each of the inner panels 2 a uniform transverse position over the whole length of the trailer.

It may be that, for certain local spaces of this trailer, this position is not the best.

Thus, if a toilet closet is provided at 28 (FIG. 2) inside one of the two caissons, the transverse dimension of this caisson, generally of the order of 45 cm, is insufficient for the said space to be able to contain a user with ease in the use of the toilet.

To temporarily increase this size, according to and advantageous feature of the invention, a screening member for the opening 22 of the panel 2 is arranged, which bounds this space 28 of the caisson so that it can occupy one or other of two positions, namely one displaced towards the center of the trailer (FIG. 5) during the occupation of the space 28 by a user and the other, displaced on the other hand towards the center of the caisson (FIG. 4) when this space is unoccupied.

Such a closure member is for example a curtain 29 suspended from an elbowed horizontal rod 30.

This rod can have a rectangular shape as illustrated.

In an advantageous modification, it is bent into a U and mounted so as to be pivotable around a fixed horizontal axis traversing the two free ends of its arms, means being provided to lock it as desired in its position outside the caisson or in its position inside the caisson, which positions are angularly separated from one another by an angle of 180° around the said horizontal axis.

As a result of which, and whatever the embodiment adopted, the trailers which have been described in the foregoing have numerous advantages over those existing hitherto, especially as regards lightness, strength, simplicity of manufacture, cost price and even appearance, the formation of the various storage, seating and working surfaces through openings or "portes" with rounded contours giving the whole an alcove appearance which is very pleasant to the eye.

As is self-evident and as emerges already from the foregoing, the invention is in no way limited to those of its types of application and embodiments which have been more especially considered; it encompasses, on the contrary, all modifications, especially those where the lateral walls of the trailer and/or its inner perforated panels would not be constituted by single flat panels, but by assemblies of several flat panels connected between themselves along rectilinear edges, or again by non-flat panels.

I claim:

1. Trailer having a hull comprising two prefabricated rigid caissons, having a width of the order of a quarter of the width of the trailer, each caisson extending longitudinally of the direction of travel of the trailer and being constituted by an outer lateral wall of the hull, by an inner longitudinal vertical perforated panel and by transverse furnishing and partitioning elements arranged so as to contribute to the rigidity of the hull, said elements coupling said panel rigidly to said outer wall, and transverse bracing members assembling said two caissons rigidly together.

2. Trailer according to claim 1, wherein said lateral walls and perforated panels are formed from sheets of cut-out plywood.

3. Trailer according to claim 1, wherein certain at least of said transverse furnishing and partitioning elements are formed from panels of the same nature and of the same thickness as said longitudinal outer wall and inner panel.

4. Trailer according to claim 1, including, to enable the arrangement of a toilet cabinet inside one of the two caissons between the outer wall of this caisson and an opening cut-out in the constituent inner panel of the same caisson, an easily removable closure device mounted on this opening, which device is capable of occupying with respect to said opening two different positions in which it projects respectively towards the inside and towards the outside of the caisson.

5. Trailer according to claim 1, including a floor having an upper portion, which is formed by a bearing surface capable of resisting wear, strictly limited to that actually usable as a floor inside the trailer.

6. Trailer according to claim 5, wherein the perforated panels have various openings bounded by rounded closed curves devoid of a sharp angle.

7. Trailer according to claim 6, including, to enable the arrangement of a toilet cabinet inside one of the two caissons between the outer wall of this caisson and an opening cut-out in the constituent inner panel of the same caisson, an easily removable closure device mounted on this opening, which device is capable of occupying with respect to said opening two different positions in which it projects respectively towards the inside and towards the outside of the caisson.

8. Trailer according to claim 1, wherein the perforated panels have various openings bounded by rounded closed curves comprising no sharp angle.

9. Trailer according to claim 8, wherein said various openings are bounded by rounded closed curves devoid of a sharp angle, said elements being formed from panels of the same nature and of the same thickness as said longitudinal outer wall and inner panel.

10. Trailer according to claim 8, including, to enable the arrangement of a toilet cabinet inside one of the two caissons between said outer wall of this caisson and an opening cut-out in the constituent inner panel of the same caisson, an easily removable closure device mounted on this opening, which device is capable of occupying with respect to said opening two different positions in which it projects respectively towards the inside and towards the outside of the caisson.

* * * * *